(12) United States Patent
Adachi et al.

(10) Patent No.: US 6,682,592 B2
(45) Date of Patent: Jan. 27, 2004

(54) INK FOR INK JET RECORDING AND INK JET RECORDING METHOD

(75) Inventors: Keiichi Adachi, Kanagawa (JP); Junichi Yamanouchi, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 8 days.

(21) Appl. No.: 10/046,760

(22) Filed: Jan. 17, 2002

(65) Prior Publication Data
US 2002/0158952 A1 Oct. 31, 2002

(30) Foreign Application Priority Data

Jan. 19, 2001 (JP) .................. P. 2001-011822
Mar. 21, 2001 (JP) .................. P. 2001-080690

(51) Int. Cl.$^7$ .............................. C09D 11/02
(52) U.S. Cl. ...................... 106/31.58; 106/31.86
(58) Field of Search .................. 106/31.58, 31.86; 347/100

(56) References Cited

U.S. PATENT DOCUMENTS

| 4,508,570 | A |   | 4/1985  | Fujii et al.    |         |
|-----------|---|---|---------|-----------------|---------|
| 5,626,655 | A |   | 5/1997  | Pawlowski et al.|         |
| 5,837,043 | A |   | 11/1998 | Wong et al.     |         |
| 6,410,605 | B1| * | 6/2002  | Shimada et al.  | 516/22  |

FOREIGN PATENT DOCUMENTS

| EP | 0 583 096 A1 |   | 2/1994 |            |
|----|--------------|---|--------|------------|
| JP | 2001064555 A | * | 3/2001 | C09D/11/00 |
| JP | 2001226616 A | * | 8/2001 | C09D/11/00 |
| JP | 2001226617 A | * | 8/2001 | C09D/11/00 |

OTHER PUBLICATIONS

English Machine Translation of JP 2001–226616, Aug. 2001.*
English Machine Translation of JP 2001–226617, Aug. 2001.*
English Machine Translation of JP 2001–064555, Mar. 2001.*

* cited by examiner

*Primary Examiner*—Mark L. Bell
*Assistant Examiner*—Veronica F. Faison
(74) *Attorney, Agent, or Firm*—Burns, Doane, Swecker & Mathis, LLP

(57) ABSTRACT

An ink for ink jet recording comprising water, a coloring agent and at least one compound represented by the following formula (1):

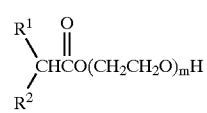

(1)

wherein $R^1$ and $R^2$ each independently represents a saturated hydrocarbon having from 2 to 20 carbon atoms, and m represents an integer of from 2 to 40 or by the following formula (2):

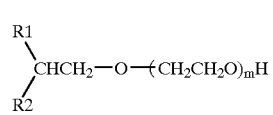

(2)

wherein $R^1$ and $R^2$ each independently represents a saturated hydrocarbon having from 2 to 20 carbon atoms, and m represents an integer of from 4 to 40.

22 Claims, No Drawings

INK FOR INK JET RECORDING AND INK JET RECORDING METHOD

FIELD OF THE INVENTION

The present invention relates to ink for an ink jet printer and to an ink jet recording method.

BACKGROUND OF THE INVENTION

An ink jet recording method has been increasingly prevailed and is further developing, because the material cost is inexpensive, capable of high speed recording and noiseless during recording.

As ink jet recording methods, there are a method of pressurizing ink by a piezoid and discharging ink droplets, a method of generating bubbles in ink by heat and discharging ink droplets, and a method of sucking and discharging ink droplets by electrostatic force. As the inks for ink jet recording, water-based inks, oil-based inks and solid inks (a melting type) are used.

Coloring agents for use in the inks for ink jet printers are required to be high in solubility in a solvent, capable of high density recording, excellent in hue, fast to light, heat, air, water and chemicals, nonpoisonous, high in purity, and inexpensive. Inks are required to have good fixing ability to image-receiving materials and not liable to blot, excellent in storage stability, and do not cause clogging at discharge opening.

Various kinds of dyes and pigments have been suggested and used in practice as inks for ink jet printers. However, a coloring agent which satisfies all of these requirements is not found yet. As a means for solving these problems, inks comprising glycerin, diethylene glycol and an ethylene oxide addition product of alcohol are disclosed in JP-A-58-74761 and JP-A-60-92369 (the term "JP-A" as used herein means an "unexamined published Japanese patent application"), and to use an ethylene oxide addition product of a long chain and straight chain alcohol is disclosed in JP-A-2000-265098. However, clogging of a nozzle can be prevented to a certain degree but not sufficiently and further these techniques have a drawback that the quality of the image formed is deteriorated during storage.

Further, it is suggested in JP-A-6-88048, JP-A-8-333532, JP-A-8-333533, U.S. Pat. Nos. 5,837,043 and 5,626,655 that blotting of images can be reduced by the inks using ethylene oxide addition products of higher alcohols, but clogging is liable to occur, the storage stability of printed images is poor and hues are varied.

Ink consisting of a dye, glycerin and a product comprising a carbon fluoride compound and ethylene glycols is disclosed in JP-A-10-251578, and ink comprising a dye, glycerin and an ethylene glycol lower straight chain fatty acid ester compound is disclosed in JP-A-10-251579, but these techniques also have a drawback that clogging is liable to occur, the storage stability of printed images is poor and hues are varied.

SUMMARY OF THE INVENTION

An object of the present invention is to provide ink for ink jet recording which does not cause clogging of a nozzle, has sufficient image density and is excellent in the storage stability of the images formed, and an ink jet recording method using the same.

As a result of eager investigation of the present inventors for solving the above problems, the present invention has been attained by the following means.

(1) An ink for ink jet recording comprising water, a coloring agent and at least one compound represented by the following formula (1)

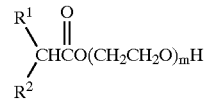

(1)

wherein $R^1$ and $R^2$ each independently represents a saturated hydrocarbon having from 2 to 20 carbon atoms, and m represents an integer of from 2 to 40 or by the following formula (2):

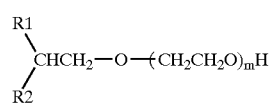

(2)

wherein $R^1$ and $R^2$ each independently represents a saturated hydrocarbon having from 2 to 20 carbon atoms, and m represents an integer of from 4 to 40.

(2) The ink for ink jet recording as described in (1) above, wherein $R^1$ and $R^2$ in formula (1) each independently represents a saturated hydrocarbon having from 4 to 13 carbon atoms.

(3) The ink for ink jet recording as described in (1) or (2) above, wherein the total number of the carbon atoms included in the saturated hydrocarbons represented by $R^1$ and $R^2$ in formula (1) is from 8 to 18.

(4) The ink for ink jet recording as described in any one of (1) to (3) above, wherein $R^1$ and $R^2$ in formula (2) each independently represents a straight chain or branched alkyl group having from 2 to 13 carbon atoms.

(5) The ink for ink jet recording as described in any one of (1) to (4) above, wherein the total number of the carbon atoms included in the straight chain or branched alkyl groups represented by $R^1$ and $R^2$ in formula (2) is from 6 to 24.

(6) The ink for ink jet recording as described in any one of (1) to (5) above, wherein the content of the at least one compound represented by the formula (1) is from 0.001 wt % to 15 wt % based on 100 wt % of the content of the ink.

(7) The ink for ink jet recording as described in any one of (1) to (6) above, wherein the content of the at least one compound represented by the formula (2) is from 0.001 wt % to 15 wt % based on 100 wt % of the content of the ink.

(8) The ink for ink jet recording as described in any one of (1) to (7) above, wherein the coloring agent is one of a water-soluble dye, a pigment, an oil-soluble dye and a disperse dye.

(9) The ink for ink jet recording as described in any one of (1) to (8) above, which further comprises a water-soluble organic solvent.

(10) The ink for ink jet recording as described in any one of (1) to (9) above, which further comprises a penetration accelerating agent.

(11) The ink for ink jet recording as described in (10) above, wherein the penetration accelerating agent is one of monoalkyl ether of polyhydric alcohol, dialkyl ether of polyhydric alcohol, a nonionic surfactant and an anionic surfactant.

(12) The ink for ink jet recording as described in (11) above, wherein the monoalkyl ether of polyhydric alcohol is one of diethylene glycol monobutyl ether and triethylene glycol monobutyl ether.

(13) The ink for ink jet recording as described in anyone of (1) to (12) above, which further comprises antiseptics.

(14) An ink jet recording method comprising ejecting an ink for ink jet recording comprising water, a coloring agent and at least one compound represented by the following formula (1):

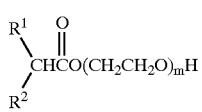

(1)

wherein $R^1$ and $R^2$ each independently represents a saturated hydrocarbon having from 2 to 20 carbon atoms, and m represents an integer of from 2 to 40 or by the following formula (2):

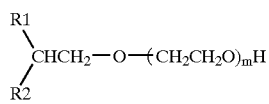

(2)

wherein $R^1$ and $R^2$ each independently represents a saturated hydrocarbon having from 2 to 20 carbon atoms, and m represents an integer of from 4 to 40.

DETAILED DESCRIPTION OF THE INVENTION

The present invention is described in detail below.

In the first place, a compound represented by formula (1) is described in detail. $R^1$ and $R^2$ each represents a saturated hydrocarbon having from 2 to 20 carbon atoms (e.g., ethyl, n-butyl, i-butyl, n-hexyl, n-heptyl, n-octyl, n-nonyl, n-decyl, n-dodecyl, n-hexadecyl, and n-octadecyl), preferably a saturated hydrocarbon having from 4 to 13 carbon atoms, and more preferably the total number of the carbon atoms of $R^1$ and $R^2$ is from 8 to 18. m represents from 2 to 40, preferably from 4 to 30, and more preferably from 4 to 20.

In the next place, a compound represented by formula (2) is described in detail. $R^1$ and $R^2$ each represents a straight chain or branched alkyl group having from 2 to 20 carbon atoms (e.g., ethyl, n-butyl, i-butyl, n-hexyl, n-heptyl, n-octyl, n-nonyl, n-decyl, n-dodecyl, n-tridecyl, n-hexadecyl, and n-octadecyl), preferably a straight chain or branched alkyl group having from 2 to 13 carbon atoms, and more preferably the total number of the carbon atoms of $R^1$ and $R^2$ is from 6 to 24. m represents from 4 to 40, preferably from 5 to 35, and more preferably from 5 to 30.

The compounds represented by formulae (1) and (2) can be obtained according to the method described in Takehiko Fujimoto, *Shin Kaimen Kasseizai Nyumon* (*New Introduction to Surfactants*), Revised Edition, p. 107 (1992), however, m in formulae (1) and (2) represents an average value which is variable according to the starting materials and methods of synthesis. Accordingly, two or more compounds different in m may be used in combination or as mixture.

The specific examples of the compounds represented by formula (1) are shown in Table 1 below, but the present invention is not limited thereto. In Table 1, $R^1$ and $R^2$ represent a normal alkyl group except $R^1$ in 1-22 and 1-23.

TABLE 1

| Compound No. | $R^1$ | $R^2$ | m |
|---|---|---|---|
| 1-1 | $C_2H_5$ | $C_4H_9$ | 3 |
| 1-2 | $C_2H_5$ | $C_4H_9$ | 5 |
| 1-3 | $C_4H_9$ | $C_6H_{13}$ | 9.5 |
| 1-4 | $C_6H_{13}$ | $C_8H_{17}$ | 5 |
| 1-5 | $C_6H_{13}$ | $C_8H_{17}$ | 8 |
| 1-6 | $C_6H_{13}$ | $C_8H_{17}$ | 10 |
| 1-7 | $C_6H_{13}$ | $C_8H_{17}$ | 11.4 |
| 1-8 | $C_6H_{13}$ | $C_8H_{17}$ | 12.5 |
| 1-9 | $C_6H_{13}$ | $C_8H_{17}$ | 15 |
| 1-10 | $C_6H_{13}$ | $C_8H_{17}$ | 25 |
| 1-11 | $C_7H_{15}$ | $C_9H_{19}$ | 14 |
| 1-12 | $C_7H_{15}$ | $C_9H_{19}$ | 15 |
| 1-13 | $C_7H_{15}$ | $C_9H_{19}$ | 20 |
| 1-14 | $C_7H_{15}$ | $C_9H_{19}$ | 25 |
| 1-15 | $C_8H_{17}$ | $C_{10}H_{21}$ | 30 |
| 1-16 | $C_{10}N_{21}$ | $C_{12}H_{25}$ | 20 |
| 1-17 | $C_{10}H_{21}$ | $C_{12}H_{25}$ | 25 |
| 1-18 | $C_{10}H_{21}$ | $C_{13}H_{27}$ | 20 |
| 1-20 | $C_{10}H_{21}$ | $C_{13}H_{27}$ | 25 |
| 1-21 | $C_{10}H_{21}$ | $C_{13}H_{27}$ | 40 |
| 1-22 | $(CH_3)_2CHCH_2-$ | $C_6H_{13}$ | 12 |
| 1-23 | $(CH_3)_3CCH_2-$ | $C_6H_{13}$ | 12 |

The content of the compound represented by formula (1) is from 0.001 to 15 wt % based on the content of the ink, preferably from 0.005 to 10 wt %, and more preferably from 0.01 to 5 wt %.

The specific examples of the compounds represented by formula (2) are shown in Table 2 below, but the present invention is not limited thereto.

TABLE 2

| Compound No. | $R^1$ | $R^2$ | m |
|---|---|---|---|
| 2-1 | $n-C_2H_5$ | $n-C_4H_9$ | 5 |
| 2-2 | $n-C_2H_5$ | $n-C_4H_9$ | 8 |
| 2-3 | $n-C_4H_9$ | $n-C_4H_9$ | 6 |
| 2-4 | $n-C_4H_9$ | $n-C_4H_9$ | 9 |
| 2-5 | $n-C_4H_9$ | $n-C_4H_9$ | 12 |
| 2-6 | $n-C_4H_9$ | $n-C_6H_{13}$ | 8 |
| 2-7 | $n-C_4H_9$ | $n-C_6H_{13}$ | 14 |
| 2-8 | $(CH_3)_2CHCH_2$ | $n-C_6H_{13}$ | 8 |
| 2-9 | $n-C_4H_9$ | $n-C_8H_{17}$ | 6 |
| 2-10 | $n-C_4H_9$ | $n-C_9H_{19}$ | 10 |
| 2-11 | $n-C_5H_{11}$ | $n-C_5H_{11}$ | 10 |
| 2-12 | $n-C_5H_{11}$ | $n-C_5H_{11}$ | 15 |
| 2-13 | $CH_3CH(CH_3)CH_2CH_2$ or $CH_3(CH_2)_2CH(CH_3)$ | $CH_3CH(CH_3)(CH_2)_4$ or $CH_3(CH_2)_2CH(CH_3)(CH_2)_2$ | 15 |
| 2-14 | $(CH_3)_3CCH_2$ | $n-C_8H_{17}$ | 15 |
| 2-15 | $n-C_5H_{11}$ | $n-C_{11}H_{23}$ | 20 |
| 2-16 | $n-C_6H_{13}$ | $n-C_6H_{13}$ | 15 |
| 2-17 | $(CH_3)_2CHCH_2CH (CH_3)$ | $(CH_3)_2CHCH_2CH(CH_3)(CH_2)_2$ | 20 |
| 2-18 | $n-C_7H_{15}$ | $n-C_9H_{19}$ | 20 |
| 2-19 | $n-C_7H_{15}$ | $n-C_9H_{19}$ | 25 |
| 2-20 | $n-C_8H_{17}$ | $n-C_{10}H_{21}$ | 25 |
| 2-21 | $n-C_{10}H_{21}$ | $n-C_{12}H_{25}$ | 25 |
| 2-22 | $n-C_{10}H_{21}$ | $n-C_{13}H_{27}$ | 30 |
| 2-23 | $n-C_{11}H_{23}$ | $n-C_{13}H_{27}$ | 30 |

The content of the compound represented by formula (2) is from 0.001 to 15 wt % based on the content of the ink, preferably from 0.005 to 10 wt %, and more preferably from 0.01 to 5 wt %.

The coloring agents for use in the present invention are water-soluble dyes, pigments, oil-soluble dyes or disperse dyes. As water-soluble dyes, acid dyes, direct dyes, basic dyes, reactive dyes and food dyes in Color Index are used, but the present invention is not limited thereto, and coloring agents having a carboxyl group or a sulfo group in the molecule and substantially soluble in ink can be used in the present invention.

As the specific examples of water-soluble dyes, the examples of acid dyes include C.I. Acid Yellow 17, 23, 42, 44, 79 and 142, C.I. Acid Red 1, 8, 13, 14, 18, 26, 27, 35, 37, 42, 52, 82, 87, 89, 92, 97, 106, 111, 114, 115, 134, 186, 249, 254 and 289, C.I. Acid Blue 9, 29, 45, 92 and 249, and C.I. Acid Black 1, 2, 7, 24, 26 and 94.

The examples of food dyes include C.I. Food Yellow 3 and 4, C.I. Food Red 7, 9 and 14, and C.I. Food Black 1 and 2.

The examples of direct dyes include C.I. Direct Yellow 1, 12, 24, 26, 33, 44, 50, 86, 120, 132, 142 and 144, C.I. Direct Red 1, 4, 9, 13, 17, 20, 28, 31, 39, 80, 81, 83, 89, 225 and 227, C.I. Direct Blue 1, 2, 6, 15, 22, 25, 71, 76, 79, 86, 87, 90, 98, 163, 165, 199 and 202, C.I. Direct Black 19, 22, 32, 38, 51, 56, 71, 74, 75, 77, 154, 168 and 171.

The examples of basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91, C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155, and C.I. Basic Black 2 and 8.

The examples of reactive dyes include C.I. Reactive Yellow 1, 5, 11, 13, 14, 20, 21, 22, 25, 40, 47, 51, 55, 65 and 67, C.I. Reactive Red 1, 14, 17, 25, 26, 32, 37, 44, 46, 55, 60, 66, 74, 79, 96 and 97, C.I. Reactive Blue 1, 2, 7, 14, 15, 23, 32, 35, 38, 41, 63, 80 and 95, and C.I. Reactive Black 3, 4, 7, 11, 12 and 17.

Water-soluble dyes are not limited to the above dyes, and compounds containing water-soluble groups represented by a carboxyl group or a sulfo group in the molecule of aryl or heteryl azo dyes having phenols, naphthols, anilines, pyrazolones, pyridones, thiazoles, open chain type active methylene compounds, pyrazolotriazoles or pyrrolotriazoles, and azomethine dyes, and capable of substantially being dissolved in ink can also be used as water-soluble dyes.

The examples of pigments include phthalocyanine series, anthraquinone series, quinacridone series, diketo-pyrrolopyrrole series, dioxazine series, indigo series, thio-indigo series, perylene series, isoindolenone series pigments, lake pigments and carbon black.

The examples of oil-soluble dyes include C.I. Solvent Yellow 14, 16, 19, 29, 30, 56, 82, 93 and 162, C.I. Solvent Red 1, 3, 8, 18, 24, 27, 43, 49, 51, 72, 73, 109, 122, 132 and 218, C.I. Solvent Violet 3, C.I. Solvent Blue 2, 11, 25, 35, 38, 67 and 70, C.I. Solvent Green 3 and 7, and C.I. Solvent Orange 2.

Oil-soluble dyes are not limited to the above dyes, and aryl or heteryl azo dyes having phenols, naphthols, anilines, pyrazolones, pyridones, thiazoles, open chain type active methylene compounds, pyrazolotriazoles or pyrrolotriazoles, and azomethine dyes can also be used as oil-soluble dyes.

The examples of disperse dyes include C.I. Disperse Yellow 5, 42, 54, 64, 79, 82, 83, 93, 99, 100, 119, 122, 124, 126, 160, 184:1, 186, 198, 199, 201, 204, 224 and 237, C.I. Disperse Orange 13, 29, 31:1, 33, 49, 54, 55, 66, 73, 118, 119 and 163, C.I. Disperse Red 54, 60, 72, 73, 86, 88, 91, 92, 93, 111, 126, 127, 134, 135, 143, 145, 152, 153, 154, 159, 164, 167:1, 181, 204, 206, 207, 221, 239, 240, 258, 277, 278, 283, 311, 323, 343, 348, 356 and 362, C.I. Disperse Violet 33, C.I. Disperse Blue 56, 60, 73, 83, 113, 128, 143, 148, 154, 158, 165, 165:1, 165:2, 176, 183, 185, 197, 198, 201, 214, 224, 225, 257, 266, 267, 287, 354, 358, 365 and 368, and C.I. Disperse Green 6:1 and 9.

At least one kind of the coloring agents for use in the ink for ink jet recording of the present invention is preferably used in an amount of from 0.1 to 20 wt % based on the content of the ink, more preferably from 0.5 to 10 wt %. When these coloring agents are used as mixture, they can be used in an arbitrary proportion.

The specific examples of such water-soluble organic solvents include polyhydric alcohols (polyols), e.g., ethylene glycol, propylene glycol, diethylene glycol, triethylene glycol, polyethylene glycol, thiodiglycol, dithiodiglycol, 2-methyl-1,3-propanediol, 1,2,6-hexanetriol, acetylene glycol derivative, glycerin, and trimethylolpropane, lower alkyl ethers of polyhydric alcohols, e.g., ethylene glycol monomethyl (or ethyl) ether, diethyleneglycolmonomethyl (orethyl) ether, and triethyleneglycolmonoethyl (or butyl) ether, heterocyclic rings, e.g., 2-pyrrolidone, N-methyl-2-pyrrolidone, 1,3-dimethyl-2-imidazolidinone, and N-ethylmorpholine, sulfur-containing compounds, e.g., sulforan, dimethyl sulfoxide, and 3-sulforen, and polyfunctional groups, e.g., diacetone alcohol, diethanolamine, and triethanolamine. Of these water-soluble organic solvents, ethylene glycol, diethylene glycol, triethylene glycol, propylene glycol, glycerin, 2-pyrrolidone, and triethanolamine are more preferred.

The water-soluble organic solvents may be used alone or two or more solvents may be used in combination. It is preferred to contain these water-soluble organic solvents in an amount of from 0.1 to 20 wt %, more preferably from 0.5 to 15 wt %.

In the present invention, an organic solvent, a surfactant or mixture of them can be contained in ink as penetration accelerating agents for well accelerating penetration of the ink for ink jet recording into paper. As the organic solvent of the above penetration accelerating agents, lower monoalkyl ethers of polyhydric alcohols such as monomethyl ether, monoethyl ether, mono-n-butyl ether, mono-iso-butyl ether, mono-n-hexyl ether of ethylene glycol, diethylene glycol, triethylene glycol, propylene glycol, and dipropylene glycol, and lower dialkyl ether of polyhydric alcohols such as dimethyl ether and diethyl ether of ethylene glycol, diethylene glycol, triethylene glycol, and propylene glycol can be exemplified. It is preferred to contain the monoalkyl ether of polyhydric alcohol being either diethylene glycol monobutyl ether or triethylene glycol monobutyl ether in the ink for ink jet recording.

The organic solvents for providing a penetrating property may be used alone or two or more of them may be used in combination, preferably in an amount of from 0.1 to 20 wt %. The organic solvents is more preferably used in an amount of from 0.5 to 15 wt % in view of preventing blotting of printed letters and print through from occurring.

As the surfactants for providing a penetrating property, besides the surfactants of the present invention, anionic surfactants, such as fatty acid salts, ester salts of higher alcohols, alkylbenzenesulfonates, sulfosuccinates, and phosphates of higher alcohols (specifically, sodium dodecylbenzenesulfonate and sodium dioctylsulfosuccinate); and nonionic surfactants, such as ethylene oxide addition products of higher alcohols, ethylene oxide addition products of alkylphenol, ethylene oxide addition products of polyhydric alcohol fatty acid esters, and acetylene glycol and ethylene oxide addition products of acetylene glycol (specifically, polyoxyethylenenonylphenyl ether, Sarfinol 104, 440, 465 and TG (manufactured by Air Products and Chemicals Inc.)) can be used.

The surfactants for providing a penetrating property may be used alone or in combination of two or more of them. They are preferably used in an amount of from 0.01 to 10 wt %, and more preferably used in an amount of from 0.1 to 5 wt % in view of preventing blotting of printed letters and print through from occurring.

As the antiseptics for use in the present invention, sodium dehydroacetate, 2-phenoxyethanol, sodium benzoate, sodium pyridinethione-1-oxide, p-hydroxybenzoic acid ethyl ester, and 1,2-benzisothiazolin-3-one and salts of it can be exemplified, and 1,2-benzisothiazolin-3-one and salts of it are preferably used.

The details of the antiseptics are described in Thesaurus Compiling Committee of Nippon Bokin Bobai Gakkai compiled, *Bokin Bobai-Zai Jiten* (*Thesaurus of Antiseptics*).

The antiseptics may be used alone or in combination of two or more of them. They are preferably used in an amount of from 0.001 to 3 wt %, more preferably from 0.01 to 1.00 wt %, in the ink.

The water-soluble dye for use in the present invention substantially becomes ink when dissolved in a water medium, but the oil-soluble dye is used as oil droplets of fine particle state dispersed in a water-immiscible organic solvent and a water medium, i.e., in the state of so-called emulsified dispersion.

"A water medium" in the present invention means water or mixture of water and a small amount of water-miscible organic solvent containing, if necessary, additives, e.g., a surfactant, a wetting agent, a stabilizer and an antiseptic.

The water-immiscible organic solvent for use in the present invention is a high boiling point organic solvent having a boiling point of 150° C. or higher, preferably 170° C. or higher. The dielectric constant of the water-immiscible organic solvent for use in the present invention is from 3 to 12, preferably from 4 to 10. The dielectric constant used here means the relative dielectric constant at 25° C. in a vacuum.

As the high boiling point organic solvents, the compounds disclosed in U.S. Pat. No. 2,322,027 can be used. Phosphoric esters, fatty acid esters, phthalic esters, benzoic esters, phenols and amides are preferably used as the high boiling point organic solvents but the present invention is not limited thereto.

The high boiling point organic solvent is preferably used from 0.1 to 5 times the oil-soluble dye in mass ratio, more preferably from 0.5 to 2 times.

Emulsifying dispersion is performed for forming fine oil droplets of an oil phase by dispersing an oil phase comprising an oil-soluble dye having dissolved in a high boiling point organic solvent, in some cases a mixed solvent of a high boiling point organic solvent and a low boiling point organic solvent, in a water phase mainly comprising water. At this time, a surfactant, a wetting agent, a dye stabilizer, an emulsion stabilizer, and an antiseptic can be added to either or both a water phase and an oil phase.

As an emulsifying method, a method of adding an oil phase to a water phase is an ordinary method but a so-called phase inversion emulsifying method can also be preferably used.

The ink can be obtained by pulverizing the pigments for use in the present invention in a water medium with a driving vessel mill, e.g., a ball mill, a centrifugal mill and a planetary ball mill, or a high speed rotation mill, e.g., a sand mill, or a medium stirring mill, e.g., a stirring tank type mill, in the presence of a dispersant and a dispersion stabilizer.

Deionized water is preferably used for preparing water-based inks for ink jet recording for use in the present invention. An appropriate amount of additives such as a drying preventing agent, a penetration accelerating agent, an ultraviolet absorber, an antioxidant, a viscosity controlling agent, a surface tension controlling agent, a dispersant, a dispersion stabilizer, an antiseptic, a corrosion preventive, a pH regulator, a defoaming agent and a chelating agent can be arbitrarily used for the purpose of preventing clogging of inks due to drying at discharge opening and improving various performances such as stability of discharge, adaptability to a print head and an ink cartridge, storage stability, a drying property after printing, image quality and the storage stability of an image.

Surfactants which are used for controlling surface tension, and as the dispersant, dispersion stabilizer and defoaming agent are described in detail below. In addition to the surfactants according to the present invention, the examples of surfactants which can be used in the present invention include anionic surfactants, such as fatty acid salts, ester salts of higher alcohols, alkylbenzenesulfonates, sulfosuccinates, and phosphates of higher alcohols; cationic surfactants, such as aliphatic amines and quaternary ammonium salts; nonionic surfactants, such as ethylene oxide addition products of higher alcohols, ethylene oxide addition products of alkylphenol, ethylene oxide addition products of polyhydric alcohol fatty acid esters, and acetylene glycol and ethylene oxide addition products of acetylene glycol; amino acid type and betaine type ampholytic surfactants; and fluorine compounds and silicone compounds can be used. These surfactants can be used alone or in combination of two or more. Sodium dodecylbenzenesulfonate, laurylsulfonate, sodium dioctylsulfosuccinate, and nonionic surfactant, such as the above ethylene oxide addition products having addition mol number of from 4 to 20, e.g., Sarfinol 440, Sarfinol 465, and Sarfinol 485 (manufactured by Air Products and Chemicals Inc.) are preferably used. The addition amount of surfactants is not restricted but they are preferably added in an amount of from 0.01 to 15 wt % of the ink, more preferably from 0.1 to 10 wt %.

As the surface tension controlling agent, the above exemplified nonionic, cationic and anionic surfactants are used in the present invention. The surface tension of the ink of the present invention is preferably from 25 to 70 mN/m when they are used or not used, more preferably from 25 to 60 mN/m.

As ultraviolet absorbers for use in the present invention for improving image storage stability, compounds which absorb ultraviolet rays and emit fluorescence, i.e., fluorescent brightening agents, e.g., the benzotriazole compounds disclosed in JP-A-58-185677, JP-A-61-190537, JP-A-2-782, JP-A-5-197075 and JP-A-9-34057, the benzophenone compounds disclosed in JP-A-46-2784, JP-A-5-194483 and U.S. Pat. No. 3,214,463, the cinnamic acid compounds disclosed in JP-B-48-30492 (the term "JP-B" as used herein means an "examined Japanese patent publication"), JP-B-56-21141, and JP-A-10-88106, the triazine compounds disclosed in JP-A-4-298503, JP-A-8-53427, JP-A-8-239368, JP-A-10-182621 and WO 96/501291, the compounds described in *Research Disclosure,* No. 24239, stilbene compounds and benzoxazole compounds can also be used.

The ultraviolet absorber is preferably used in an amount of from 0.1 to 30 wt % of the ink, more preferably from 1 to 10 wt %.

As the antioxidants which are used in the present invention for improving image storage stability, various kinds of organic and metal complex discoloration inhibitors can be used. The examples of organic discoloration inhibitors include hydroquinones, alkoxyphenols, dialkoxyphenols, phenols, anilines, amines, indanes, chromans, alkoxyanilines and heterocyclic rings, and the examples of metal complexes include nickel complexes and zinc complexes. Specifically, the compounds disclosed in the patents quoted in Research Disclosure, No. 17643, Items VII-I and J, ibid., No. 15162, ibid., No. 18716, p. 650, left column, ibid., No. 36544, p. 527, and ibid., No. 307105, p. 872, and general formulae of representative compounds and exemplified compounds disclosed in JP-A-62-215272, pp. 127 to 137 can be used.

The antioxidants is preferably used in an amount of from 0.1 to 30 wt % of the ink, more preferably from 1 to 10 wt %.

The ink according to the present invention preferably has a pH value of from 6 to 10, more preferably from 7 to 10, in view of the storage stability. As the pH regulators used for that purpose, alkali metal hydroxide, e.g., lithium hydroxide and potassium hydroxide, carbonates, e.g., sodium carbonate and sodium hydrogencarbonate, inorganic bases, e.g., potassium acetate, sodium silicate and disodium phosphate, and organic bases, e.g., N-methyldiethanolamine and triethanolamine can be exemplified.

As the viscosity controlling agents, isopropanol, butanol, 1,5-pentanediol, polyvinyl alcohol and urea derivative can be used. The addition amount of the viscosity controlling agent is preferably from 0.01 to 20 wt % of the ink, more preferably from 0.1 to 10 wt %. The viscosity of the ink of the present invention is preferably 30 mPas or less when they are used or not used, more preferably 30 mPa·s.

As the corrosion preventives, acid sulfite, sodium thiosulfate, ammonium thioglycolate, diisopropylammonium nitrite, pentaerythritol tetranitrate, dichloroammonium nitrite, and benzotriazole can be exemplified. They are preferably used in an amount of from 0.02 to 5.00 wt %.

As other additives, a chelating agent represented by EDTA and derivatives of EDTA can be used, if necessary, for capturing impurities in coloring agents or metal ions which are supposed to be eluted from cartridges.

The ink according to the present invention can be used to form images on well-known materials to be recorded, i.e., ordinary paper, resin-coated paper, special paper for ink jet recording as disclosed in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, films, common paper for electrophotography, napkins, glass, metals and ceramics.

The supports of these materials to be recorded may be any of pulp, synthetic paper and plastic films, and paper and plastic films both surfaces of which are laminated with polyolefin (e.g., polyethylene, polystyrene, polyethylene terephthalate, polybutene and copolymers of them) are more preferably used. It is preferred to add a white pigment (e.g., titanium oxide or zinc oxide) or a toning dye (e.g., cobalt blue, ultramarine or neodymium oxide) to polyolefin.

An ink-receiving layer provided on the support contains a pigment and an aqueous binder. A white pigment is preferably used as the pigment. The examples of the white pigments include inorganic white pigments, e.g., calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments, e.g., styrene-based pigments, acryl-based pigments, urea resins and melamine resins. As the white pigment to be contained in the ink-receiving layer, porous inorganic pigments are preferably used, and synthetic amorphous silica having large pore area is particularly preferably used.

As the aqueous binders to be contained in the ink-receiving layer, water-soluble high polymers, e.g., polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide, polyalkylene oxide derivative, and water-dispersible high polymers, e.g., a styrene-butadiene latex and an acryl emulsion can be exemplified. These aqueous binders can be used alone or in combination of two or more of them. Of these compounds, polyvinyl alcohol and silanol-modified polyvinyl alcohol are particularly preferably used in the present invention in the point of adhesion to pigments and peeling-off resistance of the ink-receiving layer.

The ink-receiving layer may contain a mordant, a hydration resisting agent, a light fastness improving agent, a surfactant and other additives, besides the pigment and the aqueous binder.

It is preferred that the mordants to be contained in the ink-receiving layer is immobilized, and polymer mordants are preferably used for that purpose.

Polymer mordants are disclosed in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. Image-receiving materials containing the polymer mordants disclosed in JP-A-1-161236, pp. 212 to 215 are particularly preferred.

The hydration resisting agent is effective for the hydration resistance of an image, and cation resins are particularly preferably used as the hydration resisting agent. As such cation resins, polyamide polyamine epichlorohydrin, polyethyleneimine, polyaminesulfone, dimethyldiallylammonium chloride polymer, and cation polyacrylamide can be exemplified, and polyamide polyamine epichlorohydrin is preferred of these.

As the light fastness improving agent, ultraviolet absorbers such as zinc sulfate, zinc oxide, hindered amine-series antioxidants, benzophenone and benzotriazole can be exemplified.

Besides the above-described additives to be added to the ink-receiving layer, a pigment dispersant, a thickener, a defoaming agent, a dye, a fluorescent brightening agent, an antiseptic, a pH regulator, a matting agent, and a hardening agent can be exemplified. The ink-receiving layer may comprise one or two layers.

The material to be recorded may be provided with a backing layer, and a polymer latex (polymer fine particle dispersion) maybe added to the constituting layer of the material to be recorded (inclusive of a backing layer). The polymer latex is used for the purpose of the improvement of physical properties of the film, e.g., dimensional stabilization, curling prevention, adhesion prevention and the prevention of cracking of the film. Polymer latexes are disclosed in JP-A-62-245258, JP-A-62-136648 and JP-A-62-

110066. When a polymer latex having a low glass transition temperature (40° C. or lower) is added to a mordant-containing layer, cracking of the layer and curling can be prevented from occurring. Further, when a polymer latex having a high glass transition temperature is added to a backing layer, curling can also be prevented.

The ink according to the present invention can be used in various well-known methods, irrespective of the systems of ink jet recording, e.g., a charge control system of discharging ink by making use of electrostatic induction, a drop-on-demand system (a pressure pulse system) by making use of oscillation pressure of a piezoid, an acoustic ink jet system of converting electric signals to acoustic beams to thereby irradiate ink, and discharging the ink by making use of the pressure of radiation, and a thermal ink jet (bubble jet) system of heating ink to form bubbles, and discharging the ink by making use of the pressure generated.

The ink according to the present invention can be used in full color printing using yellow, magenta and cyan inks. A system of injecting ink called photo-ink having low density in a large number in small volume, a system of improving image quality by using a plurality of inks having substantially the same hue and different densities, and a system of using colorless and transparent ink are included in ink jet recording systems.

EXAMPLE

The present invention will be described in detail with reference to the examples below. In the examples, "parts" means "parts by mass" unless otherwise indicated, and exemplified compounds means the compounds exemplified in Tables 1 and 2 above.

Examples 1 to 8

Inks of the present invention were prepared by mixing and dissolving each component shown below, and filtering the solution through a membrane filter having a pore diameter of 0.2 μm (trade name: Astro Pore CASL 20, 2.5 CMD, manufactured by Fuji Photo Film Co., Ltd.).

Ink in Example 1

| | |
|---|---|
| C.I. Direct Yellow 86 | 5.0 parts |
| Exemplified Compound 1-3 | 3.0 parts |
| Glycerin | 15.0 parts |
| Diethylene Glycol | 16.0 parts |
| TEGmBE | 12.0 parts |
| 1,2-Benzisothiazolin-3-one | 0.1 part |
| Deionized Water | 48.9 parts |

Ink in Example 2

| | |
|---|---|
| C.I. Acid Red 52 | 4.5 parts |
| Exemplified Compound 1-5 | 3.0 parts |
| Glycerin | 16.0 parts |
| Diethylene Glycol | 11.0 parts |
| Sarfinol 465 | 11.5 parts |
| 1,2-Benzisothiazolin-3-one | 0.2 part |
| Deionized Water | 53.8 parts |

Ink in Example 3

| | |
|---|---|
| C.I. Direct Blue 87 | 3.5 parts |
| Exemplified Compound 1-7 | 2.0 parts |
| Glycerin | 18.0 parts |
| Diethylene Glycol | 13.0 parts |
| Triethanolamine | 6.5 parts |
| 1,2-Benzisothiazolin-3-one | 0.1 part |
| Deionized Water | 56.9 parts |

Ink in Example 4

| | |
|---|---|
| C.I. Food Black 2 | 1.5 parts |
| C.I. Direct Black 19 | 2.5 parts |
| Exemplified Compound 1-8 | 3.0 parts |
| Glycerin | 12.0 parts |
| 2-Pyrrolidone | 18.0 parts |
| Triethanolamine | 11.0 parts |
| 1,2-Benzisothiazolin-3-one | 0.1 part |
| Deionized Water | 51.9 parts |

Ink in Example 5

| | |
|---|---|
| C.I. Direct Blue 87 | 2.5 parts |
| C.I. Acid Blue 9 | 1.0 part |
| Exemplified Compound 1-10 | 2.5 parts |
| Glycerin | 17.0 parts |
| Diethylene Glycol | 12.0 parts |
| Triethanolamine | 5.5 parts |
| TEGmBE | 12.0 parts |
| 1,2-Benzisothiazolin-3-one | 0.1 part |
| Benzotriazole | 0.1 part |
| Deionized Water | 46.3 parts |

Ink in Example 6

| | |
|---|---|
| C.I. Acid Red 52 | 1.2 parts |
| Exemplified Compound 1-7 | 1.5 parts |
| Glycerin | 12.0 parts |
| Diethylene Glycol | 14.0 parts |
| Triethanolamine | 6.0 parts |
| DEGmBE | 5.0 parts |
| Sodium Dehydroacetate | 0.1 part |
| Deionized Water | 60.2 parts |

Ink in Example 7

| | |
|---|---|
| C.I. Direct Blue 87 | 4.0 parts |
| Exemplified Compound 1-7 | 1.0 part |
| Glycerin | 6.0 parts |
| Diethylene Glycol | 3.0 parts |
| Ethylene Clycol | 5.0 parts |
| Sarfinol 465 | 1.0 part |
| 1,2-Benzisothiazolin-3-one | 0.1 part |
| Benzotriazole | 0.1 parts |
| Deionized Water | 79.8 parts |

Ink in Example 8

| | |
|---|---|
| C.I. Acid Blue 9 | 3.0 parts |
| Exemplified Compound 1-20 | 0.4 parts |
| Glycerin | 4.0 parts |

-continued

| | |
|---|---|
| Triethylene Glycol | 20.0 parts |
| TEGmBE | 15.0 parts |
| 1,2-Benzisothiazolin-3-one | 0.2 parts |
| Deionized Water | 57.4 parts |

Ink in Comparative Example 1

| | |
|---|---|
| C.I. Acid Blue 9 | 3.0 parts |
| Diethylene Glycol Monostearate | 0.2 parts |
| Glycerin | 30.0 parts |
| Deionized Water | 66.8 parts |

Ink in Comparative Example 2

| | |
|---|---|
| C.I. Acid Red 52 | 4.0 parts |
| Nonipole Soft SDH90 | 5.0 parts |
| Diethylene Glycol | 15.0 parts |
| Sarfinol 465 | 2.0 part |
| Deionized Water | 74.0 parts |

Ink in Comparative Example 3

| | |
|---|---|
| C.I. Direct Blue 87 | 3.0 parts |
| Glycerin | 18.0 parts |
| Diethylene Glycol | 13.0 parts |
| Triethanolamine | 6.5 parts |
| 1,2-Benzisothiazolin-3-one | 0.1 parts |
| Deionized Water | 59.4 parts |

In the above Examples, TEGmBE means triethylene glycol monobutyl ether, Nonipole Soft SDH90 means ethylene oxide addition product of higher alcohol (manufactured by Sanyo Chemical Industries Co., Ltd.).

Tests for Evaluation

Printing was performed using each ink prepared above in Examples 1 to 8 and Comparative Examples 1 to 3, and ink jet printer PM-770C (manufactured by Seiko Epson Corporation), and evaluations were performed on the basis of the criteria shown below regarding (1) clogging resistance, (2) storage stability of the image, and (3) blotting of the image. The results obtained are shown in Table 3. Papers used in the evaluation were the following four kinds of papers.

(A) Xerox P Paper (manufactured by Fuji Xerox Co., Ltd.)
(B) High grade special paper (manufactured by Fuji Photo Film Co., Ltd.)
(C) Photographic glossy paper EX (manufactured by Fuji Photo Film Co., Ltd.)
(D) PM photographic paper (manufactured by Seiko Epson Corporation)

(1) Clogging Resistance

The printer was charged with ink, after alphameric characters were printed continuously for 10 minutes, printing was stopped and the printer was allowed to stand for two weeks. After two weeks, the recovering operation of clogging of the nozzle was performed and clogging resistance was evaluated by the times of the recovering operation performed until blurring and lacking of the characters did not occur.

A: Normal printing is feasible within 5 times of recovering operation.

B: Normal printing is feasible by 6 to 10 times of recovering operation.

C: Normal printing is feasible by more than 11 times of recovering operation.

(2) Storage Stability of Image

A sample of solid printing was formed using each ink prepared above in Examples 1 to 8 and Comparative Examples 1 to 3, and ink jet printer PM-770C (manufactured by Seiko Epson Corporation). The density just after printing Ci was measured with X-rite 310, then the sample was irradiated with xenon light (85,000 lux) for three days using a weather meter (manufactured by Atlas), and then the density Cf was again measured and the residual rate [Cf/Ci×100] of the coloring agent was obtained.

A: Residual rate of the coloring agent is 70% or more.
B: Residual rate of the coloring agent is 40% or more and less than 70%.
C: Residual rate of the coloring agent is less than 40%.

(3) Blotting of Image

After the above sample of solid printing was allowed to stand at room temperature for one week, and the boundary between the printing part and the non-printing part was visually observed.

A: Change is not observed.
B: Blotting is observed a little.
c: Considerable blotting is observed.

TABLE 3

| | | Item of Evaluation | | | | | | | |
|---|---|---|---|---|---|---|---|---|---|
| Example No. | Clogging Resistance | Storage Stability of Image | | | | Blotting of Image | | | |
| | | (A) | (B) | (C) | (D) | (A) | (B) | (C) | (D) |
| Example 1 | A | B | B | A | A | B | B | A | A |
| Example 2 | A | B | B | A | A | B | A | A | A |
| Example 3 | A | A | A | A | A | A | A | A | A |
| Example 4 | A | B | B | A | A | A | A | A | A |
| Example 5 | A | B | B | A | A | A | A | A | A |
| Example 6 | A | A | A | A | A | A | A | A | A |
| Example 7 | A | A | A | A | A | A | A | A | A |
| Example 8 | A | B | B | A | A | B | A | A | A |
| Comparative Example 1 | B | C | C | B | B | B | B | B | B |
| Comparative Example 2 | A | C | C | C | C | B | B | B | B |
| Comparative Example 3 | A | C | C | C | B | B | A | A | A |

The samples in which the inks of the present invention were used were excellent in clogging resistance, storage stability of the image and blotting of the image generally, and particularly when the inks of the present invention were used to photographic glossy papers (papers (C) and (D)), the storage stability of the images obtained was excellent.

Example 9

Four point zero (4.0) parts of C.I. Pigment Blue 15:3, 7.0 parts of JONCRYL J-61J and 7.5 parts of deionized water were mixed and dispersed with a paint shaker, to thereby prepare a dispersion solution.

Ink in Example 9

| | |
|---|---|
| The above dispersion solution | 18.0 parts |
| Exemplified Compound 1-7 | 5.0 parts |
| Ethylene Glycol | 10.9 parts |

| -continued | |
|---|---|
| Glycerin | 15.8 parts |
| 2-Pyrrolidone | 1.6 parts |
| TEGmBE | 14.7 parts |
| 1,2-Benzisothiazolin-3-one | 0.1 parts |
| Deionized Water | 33.9 parts |

When clogging resistance, storage stability of the image and blotting of the image were evaluated with this ink in the same manner as in Examples 1 to 8, good results were obtained.

Example 10

Six point zero (6.0) parts of Aizen Spilon Blue GNH (manufactured by Hodogaya Kagaku Co., Ltd.) was dissolved in 2.5 parts of dioctylsulfosuccinic acid, 8.0 parts of dibutyl phthalate and 50 parts of ethyl acetate at 70° C. Deionized water (250 parts) was added to the above solution with stirring and an oil-in-water droplet type dispersion was prepared. The dispersion was atomized by passing through a micro fluidizer (MICROFLUIDEX INC.) 5 times under pressure of 60 MPa. This product was subjected to desolvation under reduced pressure until the odor of ethyl acetate fadedout, thereby a fine emulsion was obtained.

Ink in Example 10

| | |
|---|---|
| The above fine emulsion | 28.0 parts |
| Exemplified Compound 1-7 | 5.0 parts |
| Glycerin | 9.0 parts |
| Diethylene Glycol | 11.0 parts |
| Sarfinol 465 | 5.5 parts |
| 1,2-Benzisothiazolin-3-one | 0.2 parts |
| Deionized Water | 41.3 parts |

When clogging resistance, storage stability of the image and blotting of the image were evaluated with this ink in the same manner as in Examples 1 to 8, good results were obtained.

Examples 11 to 18

Inks of the present invention were prepared by mixing and dissolving each component shown below, and filtering the solution through a membrane filter having a pore diameter of 0.2 μm (trade name: Astro Pore CASL 20, 2.5 CMD, manufactured by Fuji Photo Film Co., Ltd.).

Ink in Example 11

| | |
|---|---|
| C.I. Direct Yellow 86 | 5.0 parts |
| Exemplified Compound 2-4 | 3.0 parts |
| Glycerin | 15.0 parts |
| Diethylene Glycol | 16.0 parts |
| 1,2-Benzisothiazolin-3-one | 0.1 parts |
| Deionized Water | 60.9 parts |

Ink in Example 12

| | |
|---|---|
| C.I. Acid Red 52 | 4.5 parts |
| Exemplified Compound 2-5 | 3.0 parts |
| Glycerin | 14.0 parts |
| Diethylene Glycol | 11.0 parts |
| Sarfinol 465 | 10.0 parts |
| 1,2-Benzisothiazolin-3-one | 0.2 parts |
| Deionized Water | 57.3 parts |

Ink in Example 13

| | |
|---|---|
| C.I. Direct Blue 87 | 3.0 parts |
| Exemplified Compound 2-7 | 2.0 parts |
| Glycerin | 17.0 parts |
| Diethylene Glycol | 14.0 parts |
| Triethanolamine | 6.5 parts |
| 1,2-Benzisothiazolin-3-one | 0.1 parts |
| Deionized Water | 57.4 parts |

Ink in Example 14

| | |
|---|---|
| C.I. Food Black 2 | 1.5 parts |
| C.I. Direct Black 19 | 2.5 parts |
| Exemplified Compound 2-9 | 3.0 parts |
| Glycerin | 13.0 parts |
| 2-Pyrrolidone | 16.0 parts |
| Triethanolamine | 11.0 parts |
| 1,2-Benzisothiazolin-3-one | 0.1 parts |
| Deionized Water | 52.9 parts |

Ink in Example 15

| | |
|---|---|
| C. I. Direct Blue 87 | 2.5 parts |
| C.I. Acid Blue 9 | 1.0 part |
| Exemplified Compound 2-12 | 2.5 parts |
| Glycerin | 15.0 parts |
| Diethylene Glycol | 11.0 parts |
| Triethanolamine | 4.0 parts |
| TEGmBE | 11.0 parts |
| 1,2-Benzisothiazolin-3-one | 0.1 parts |
| Benzotriazole | 0.1 parts |
| Deionized Water | 52.8 parts |

Ink in Example 16

| | |
|---|---|
| C.I. Acid Red 52 | 1.2 parts |
| Exemplified Compound 2-13 | 1.5 parts |
| Glycerin | 10.0 parts |
| Diethylene Glycol | 12.0 parts |
| Triethanolamine | 6.0 parts |
| DEGmBE | 5.0 parts |
| Sodium Dehydroacetate | 0.1 parts |
| Deionized Water | 64.2 parts |

Ink in Example 17

| | |
|---|---|
| C.I. Direct Blue 87 | 4.0 parts |
| Exemplified Compound 2-22 | 1.0 part |
| Glycerin | 6.0 parts |
| Diethylene Glycol | 3.0 parts |
| Ethylene Glycol | 4.0 parts |
| Sarfinol 465 | 3.0 parts |
| 1,2-Benzisothiazolin-3-one | 0.1 parts |
| Benzotriazole | 0.1 parts |
| Deionized Water | 78.8 parts |

Ink in Example 18

| C.I. Acid Blue 9 | 3.0 parts |
|---|---|
| Exemplified Compound 2-12 | 3.0 parts |
| Glycerin | 4.0 parts |
| Triethylene Glycol | 15.0 parts |
| TEGmBE | 13.0 parts |
| 1,2-Benzisothiazolin-3-one | 0.2 parts |
| Deionized Water | 61.8 parts |

Ink in Comparative Example 4

| C.I. Acid Blue 9 | 3.0 parts |
|---|---|
| TEGmBE | 5.0 parts |
| Glycerin | 30.0 parts |
| Deionized Water | 62.0 parts |

Ink in Comparative Example 5

| C.I. Acid Red 52 | 4.0 parts |
|---|---|
| Nonipole Soft SDH90 | 5.0 parts |
| Diethylene Glycol | 15.0 parts |
| Sarfinol 465 | 2.0 parts |
| Deionized Water | 74.0 parts |

Ink in Comparative Example 6

| C.I. Direct Blue 87 | 3.0 parts |
|---|---|
| Glycerin | 18.0 parts |
| Diethylene Glycol | 13.0 parts |
| Triethanolamine | 6.5 parts |
| 1,2-Benzisothiazolin-3-one | 0.1 parts |
| Deionized Water | 59.4 parts |

In the above Examples, TEGmBE means triethylene glycol monobutyl ether, DEGmBE means diethylene glycol monobutyl ether, Nonipole Soft SDH90 means ethylene oxide addition product of higher alcohol (manufactured by Sanyo Chemical Industries Co., Ltd.).

Tests for Evaluation

Printing was performed using each ink prepared above in Examples 11 to 18 and Comparative Examples 4 to 6, and ink jet printer PM-770C (manufactured by Seiko Epson Corporation), and evaluations were performed on the basis of the criteria shown below regarding (1) clogging resistance, (2) storage stability of the image, and (3) blotting of the image. The results obtained are shown in Table 4. Papers used in the evaluation were the following four kinds of papers.

(A) Xerox P Paper (manufactured by Fuji Xerox Co., Ltd.)
(B) High grade special paper (manufactured by Fuji Photo Film Co., Ltd.)
(C) Photographic glossy paper EX (manufactured by Fuji Photo Film Co., Ltd.)
(D) PM photographic paper (manufactured by Seiko Epson Corporation)

(1) Clogging Resistance

The printer was charged with ink, after alphameric characters were printed continuously for 10 minutes, printing was stopped and the printer was allowed to stand for two weeks. After two weeks, the recovering operation of clogging of the nozzle was performed and clogging resistance was evaluated by the times of the recovering operation performed until blurring and lacking of the characters did not occur.

A: Normal printing is feasible within 5 times of recovering operation.
B: Normal printing is feasible by 6 to 10 times of recovering operation.
C; Normal printing is feasible by more than 11 times of recovering operation.

(2) Storage Stability of Image

A sample of solid printing was formed using each ink prepared above in Examples 11 to 18 and Comparative Examples 4 to 6, and ink jet printer PM-770C (manufactured by Seiko Epson Corporation). The density just after printing Ci was measured with X-rite 310, then the sample was irradiated with xenon light (85,000 lux) for three days using a weather meter (manufactured by Atlas), and then the density Cf was again measured and the residual rate [Cf/Ci×100] of the coloring agent was obtained.

A: Residual rate of the coloring agent is 70% or more.
B: Residual rate of the coloring agent is 40% or more and less than 70%.
C: Residual rate of the coloring agent is less than 40%.

(3) Blotting of Image

After the above sample of solid printing was allowed to stand at room temperature for one week, and the boundary between the printing part and the non-printing part was visually observed.

A: Change is not observed.
B: Blotting is observed a little.
C: Considerable blotting is observed.

TABLE 4

| | | Item of Evaluation | | | | | | | |
|---|---|---|---|---|---|---|---|---|---|
| Example No. | Clogging Resistance | Storage Stability of Image | | | | Blotting of Image | | | |
| | | (A) | (B) | (C) | (D) | (A) | (B) | (C) | (D) |
| Example 11 | A | A | A | A | A | A | A | A | A |
| Example 12 | A | A | A | A | A | A | A | A | A |
| Example 13 | A | A | A | A | A | A | A | A | A |
| Example 14 | A | A | A | A | A | A | A | A | A |
| Example 15 | A | A | A | A | A | A | A | A | A |
| Example 16 | A | A | A | A | A | A | A | A | A |
| Example 17 | A | B | B | A | A | B | A | A | A |
| Example 18 | A | A | A | A | A | A | A | A | A |
| Comparative Example 4 | C | C | C | B | B | C | C | B | B |
| Comparative Example 5 | B | C | C | C | B | C | C | B | B |
| Comparative Example 6 | B | C | C | B | B | B | B | A | A |

The samples in which the inks of the present invention were used were excellent in clogging resistance, storage stability of the image and blotting of the image generally, and particularly when the inks of the present invention were used to photographic glossy papers (papers (C) and (D)), the storage stability of the images obtained was excellent.

Example 19

Four point zero (4.0) parts of C.I. Pigment Blue 15:3, 7.0 parts of JONCRYL J-61J and 7.5 parts of deionized water were mixed and dispersed with a paint shaker, to thereby prepare a dispersion solution.

Ink in Example 19

| The above dispersion solution | 18.0 parts |
|---|---|
| Exemplified Compound 2-9 | 5.0 parts |
| Ethylene Glycol | 10.9 parts |
| Glycerin | 15.8 parts |
| 2-Pyrrolidone | 2.0 parts |
| TEGmBE | 12.0 parts |
| 1,2-Benzisothiazolin-3-one | 0.1 parts |
| Deionized Water | 36.2 parts |

When clogging resistance, storage stability of the image and blotting of the image were evaluated with the ink in Example 19 in the same manner as in Examples 11 to 18, the same good results were obtained.

Example 20

Six point zero (6.0) parts of Aizen Spilon Blue GNH (manufactured by Hodogaya Kagaku Co., Ltd.) was dissolved in 2.5 parts of dioctylsulfosuccinic acid, 8.0 parts of dibutyl phthalate and 50 parts of ethyl acetate at 70° C. Deionized water (250 parts) was added to the above solution with stirring and an oil-in-water droplet type dispersion was prepared. The dispersion was atomized by passing through a micro fluidizer (MICROFLUIDEX INC.) 5 times under pressure of 60 MPa. This product was subjected to desolvation under reduced pressure until the odor of ethyl acetate faded out, thereby a fine emulsion was obtained.

Ink in Example 20

| The above fine emulsion | 28.0 parts |
|---|---|
| Exemplified Compound 2-5 | 3.0 parts |
| Glycerin | 8.0 parts |
| Diethylene Glycol | 11.0 parts |
| Sarfinol 465 | 6.0 parts |
| 1,2-Benzisothiazolin-3-one | 0.2 parts |
| Deionized Water | 43.8 parts |

When clogging resistance, storage stability of the image and blotting of the image were evaluated with this ink in the same manner as in Examples 11 to 18, the same good results were obtained.

As described above, the present invention can provide reliable inks which do not cause clogging of nozzles and are stable in printing performances. When printing is performed with ordinary paper and special paper for ink jet recording, the inks of the present invention are excellent in the storage stability of images and blotting of images are less as compared with comparative inks. When printing is performed with paper having high photographic picture quality provided with a silica porous layer as the image-receiving layer, the storage stability of images is improved as compared with comparative examples. Further, even in the case of ink of low density of dye called photo-ink, the present invention can provide ink having high image quality without reducing the image storage stability.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth herein.

What is claimed is:

1. An ink for ink jet recording comprising water, a coloring agent and at least one compound represented by the following formula (1):

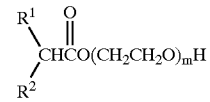

(1)

wherein $R^1$ and $R^2$ each independently represents a saturated hydrocarbon having from 2 to 20 carbon atoms, and m represents an integer of from 2 to 40.

2. The ink for ink jet recording of claim 1, wherein $R^1$ and $R^2$ in formula (1) each independently represents a saturated hydrocarbon having from 4 to 13 carbon atoms.

3. The ink for ink jet recording of claim 1, wherein the total number of the carbon atoms included in the saturated hydrocarbons represented by $R^1$ and $R^2$ in formula (1) is from 8 to 18.

4. The ink for ink jet recording of claim 1, wherein the content of the at least one compound represented by the formula (1) is from 0.001 wt % to 15 wt % based on 100 wt % of the content of the ink.

5. The ink for ink jet recording of claim 1, wherein the coloring agent is one of a water-soluble dye, a pigment, an oil-soluble dye and a disperse dye.

6. The ink for ink jet recording of claim 1, which further comprises a water-soluble organic solvent.

7. The ink for ink jet recording of claim 1, which further comprises a penetration accelerating agent.

8. The ink for ink jet recording of claim 7, wherein the penetration accelerating agent is one of monoalkyl ether of polyhydric alcohol, dialkyl ether of polyhydric alcohol, a nonionic surfactant and an anionic surfactant.

9. The ink for ink jet recording of claim 8, wherein the monoalkyl ether of polyhydric alcohol is one of diethylene glycol monobutyl ether and triethylene glycol monobutyl ether.

10. The ink for ink jet recording of claim 1, which further comprises antiseptics.

11. An ink jet recording method comprising ejecting an ink for ink jet recording comprising water, a coloring agent and at least one compound represented by the following formula (1):

(1)

wherein $R^1$ and $R^2$ each independently represents a saturated hydrocarbon having from 2 to 20 carbon atoms, and m represents an integer of from 2 to 40.

12. An ink jet recording method comprising ejecting an ink for ink jet recording comprising water, a coloring agent and at least one compound represented by the following formula (2):

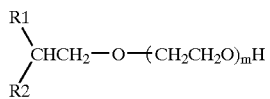

(2)

wherein $R^1$ and $R^2$ each independently represents a saturated hydrocarbon having from 2 to 20 carbon atoms, and m represents an integer of from 4 to 40.

13. An ink for ink jet recording comprising water, a coloring agent and at least one compound represented by the following formula (2):

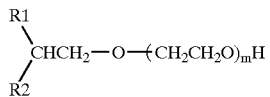

(2)

wherein $R^1$ and $R^2$ each independently represents a saturated hydrocarbon having from 2 to 20 carbon atoms, and m represents an integer of from 4 to 40.

14. The ink for ink jet recording of claim 13, wherein $R^1$ and $R^2$ in formula (2) each independently represents a straight chain or branched alkyl group having from 2 to 13 carbon atoms.

15. The ink for ink jet recording of claim 13, wherein the total number of the carbon atoms included in the straight chain or branched alkyl groups represented by $R^1$ and $R^2$ in formula (2) is from 6 to 24.

16. The ink for ink jet recording of claim 13, wherein the content of the at least one compound represented by the formula (2) is from 0.001 wt % to 15 wt % based on 100 wt % of the content of the ink.

17. The ink for ink jet recording of claim 13, wherein the coloring agent is one of a water-soluble dye, a pigment, an oil-soluble dye and a disperse dye.

18. The ink for ink jet recording of claim 13, which further comprises a water-soluble organic solvent.

19. The ink for ink jet recording of claim 13, which further comprises a penetration accelerating agent.

20. The ink for ink jet recording of claim 19, wherein the penetration accelerating agent is one of monoalkyl ether of polyhydric alcohol, dialkyl ether of polyhydric alcohol, a nonionic surfactant and an anionic surfactant.

21. The ink for ink jet recording of claim 20, wherein the monoalkyl ether of polyhydric alcohol is one of diethylene glycol monobutyl ether and triethylene glycol monobutyl ether.

22. The ink for ink jet recording of claim 13, which further comprises antiseptics.

* * * * *